May 23, 1933.　　　J. A. DUMAS　　　1,910,682
ELECTRIC OVEN
Filed March 15, 1932　　2 Sheets-Sheet 1

INVENTOR
Joseph Arthur Dumas
BY
ATTORNEYS

May 23, 1933.   J. A. DUMAS   1,910,682
ELECTRIC OVEN
Filed March 15, 1932   2 Sheets-Sheet 2
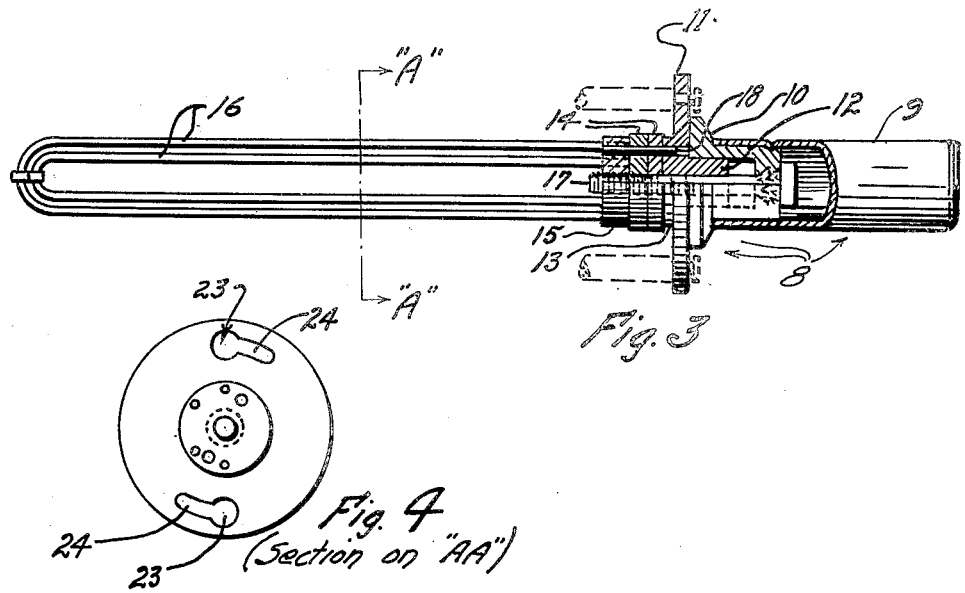
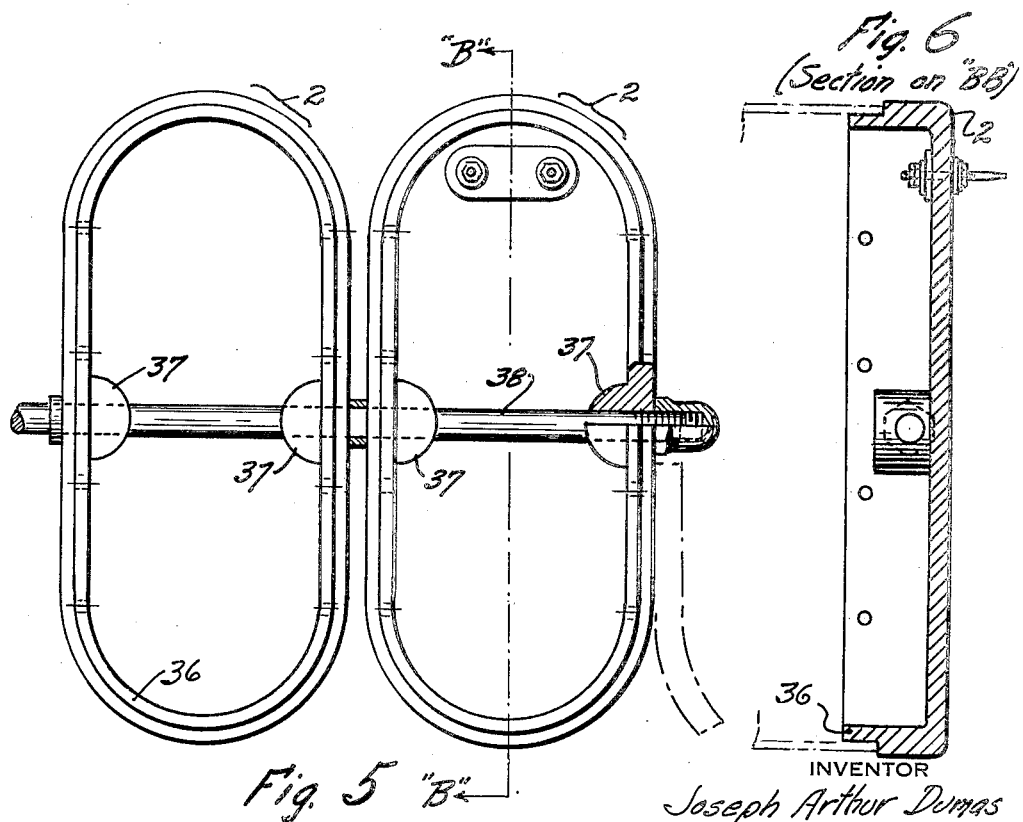
INVENTOR
Joseph Arthur Dumas
BY
ATTORNEYS.

Patented May 23, 1933

1,910,682

UNITED STATES PATENT OFFICE

JOSEPH ARTHUR DUMAS, OF BROOKLYN, NEW YORK

ELECTRIC OVEN

Application filed March 15, 1932. Serial No. 598,894.

My invention relates to an electric oven, in particular, to an electric oven adapted for the roasting of foods which, in the process of roasting, give off moisture or vapor.

The principal object of my invention is the provision of a device for the roasting of foods, which, in the process of roasting, give off moisture, provided with means for causing the expelled moisture to build up a pressure in the roasting chamber and means operated by said pressure for turning off the heat when the roasting is complete.

Another important object of my invention is the provision of an oven in which the food being roasted is subjected to fluctuations in pressure, the pressure first increasing, then dropping, then increasing again, and so on.

An additional object of my invention is the provision of sliding trays for carrying the object to be roasted into an oven of the type described and the provision of means on said oven actuated by said tray as it is pushed into place for turning on the heat.

A further object of my invention is the provision of means in an oven of the type described for permitting some of the developed steam to escape when the heat is turned off and for bringing about the turning on of the heat again when the pressure of steam has been reduced below a predetermined point.

Still another object of my invention is to provide a device of the character described which is easy of construction, fool proof in operation and self-regulating.

An additional object of my invention is the construction of such ovens in units which are capable of being combined with each other to form batteries.

Further objects and advantages of my invention will appear from the following detailed description of the accompanying drawings in which:

Fig. 3 is a plan view of a slide partly in section to show the construction of the compartment sealing means;

Fig. 4 is a transverse section along the axis A—A of Fig. 3;

Fig. 5 is a front elevation of the front faces of the rear walls of two units mounted in parallel; and Fig. 6 is a vertical, longitudinal section of the rear wall and part of the casing.

Figure 1:
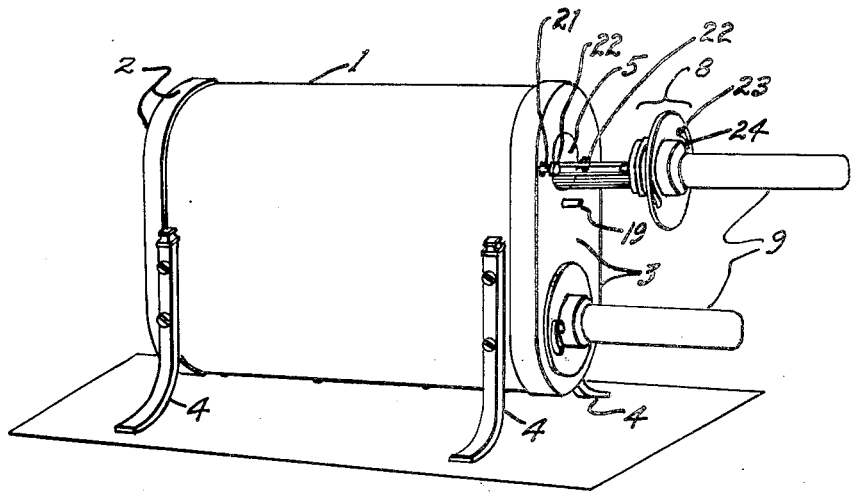
Fig. 1 is a view of a two compartment unit in perspective with one of the slides partly withdrawn from its compartment.

Referring to the drawing in detail 1 represents a casing having a rear wall 2, a front wall 3, and legs 4. The unit shown in the drawing has two compartments. Since these compartments are identical in every deail, it is deemed sufficient to describe one of them in detail. Each compartment 5 is cylindrical in shape and is surrounded by enameled wire 6 covered with an insulating cement 7. In each compartment is a slide 8 shown in detail in Figs. 3 and 4. The particular slide shown has been adapted for the roasting of frankfurters and sausages. It must be borne in mind that the food bearing portion of the slide will be varied to suit the particular food to be roasted. For example, for the roasting of meats and fowl where it is desirable to collect the juices, provision can be made on the tray of the slide for the collection of said juices. It is also to be understood that the roasting compartments can be of any shape and dimensions. For example, the roasting compartments in the embodiment shown could be of such a shape as to accommodate a large number of sausages or frankfurters arranged transversely therein. Likewise the roasting compartment could be of a size sufficient to accommodate sausages or frankfurters arranged in longitudinal bundles. There is no limitation whatsoever on the cross-sectional shape of the roasting compartment. When the compartment is made of a sufficient size to permit movement of a hand around its interior, the cleaning of the compartments presents no particular problem. Heating compartments which are too small for the admission of a hand can be made easily removable or can be cleaned with a swab.

The slide consists of a rotatable handle 9 fixed to a flanged insulating member 10 which projects within the handle 9 and abuts a disk 11 which is so proportioned as to extend for a considerable distance on all sides of the opening of compartment 5 and to shield the operator's hand from escaping steam, and which has a hub 12 on one of its faces adapted to project into the interior of insulating member 10 and form a stud shaft for the rotation of members 9 and 10 thereon, and a hub 13 on its other face adapted to fit into the opening of compartment 5. Arranged in juxtaposition to the hub 13 are two or more disks of resilient packing material 14 of a diameter to fit snugly against the circumference of the compartment 5 and adapted to be expanded under pressure. Fitting tightly against the packing disks is a nut 15 carrying the wires 16 which constitute the food carrying portion of the slide and having a threaded central opening for receiving a bolt 17 which passes through members 14, 11 and 10 and is adapted to rotate with member 10. A pin 18 passes through members 15, 14 and 13 at a point near their peripheries to prevent relative rotation of these parts.

As is obvious from the above description, the size of disks 14 can be regulated by rotation of the handle 9 being increased by rotation of handle 9 in one direction and decreased by the rotation of handle 9 in the other direction.

Projecting from the front wall of the casing at a point adjacent to the opening of compartment 5 and in that area of surface covered by disk 11 is a rod 19 which on being pushed inwardly by the insertion of the slide into the heating compartment closes the heating circuit and which upon the expulsion of the slide from the heating compartment by the vapor pressure developed therein is pushed outwardly by a spring 20 thereby breaking the heating circuit.

Projecting from the front wall of the casing on either side of the compartment 5 and in the area covered by the disk 11 is a rod 21 having an enlarged end 22 which is adapted to pass through an opening 23. In the disk 11 extending from one side of the opening 23 is a slot 24 which is of sufficient size to receive rod 21, but is too small to permit the passage of head 22 whereby, when disk 11 is rotated after the passage of head 22 through the opening 23, outward motion of the slide is prevented by the head 22. Each rod 21 extends parallel to the heating coil through a partition 25 and is provided at its end with an enlarged portion 26, the position of which is adjustable by a set screw and between which and the partition 25 is provided a spring 27 encircling the rod 21 and kept under compression by members 25 and 26. The force of this spring tends to prevent motion of the head 22 away from the front wall of the casing. Consequently, in order to expel the slide 8 from the heating compartment, the pressure of steam developed therein must overcome the force of the spring 27. The force which the spring 27 exerts varies with the particular food for the roasting of which the oven is adapted. This force must be such that, when the steam evolved in the heating chamber develops a pressure sufficient to overcome the force of the spring and push the slide outwardly from the compartment, the roasting of the food in the compartment will have been completed.

At this point it may be appropriate to discuss an important feature of my oven. The objection to practically all ovens is that the food being roasted must be watched carefully to prevent burning or charring. The structure of my oven is such that the food undergoing the process of roasting may be left unattended for long periods of time without any danger of burning. This safety is insured by the manner in which my oven operates. For example, when sufficient steam is developed in the heating compartment to overcome the force of a spring 27 and push the slide 8 outwardly from the heating compartment, the food in the roasting compartment will be in the condition in which the operator desires it for consumption. That is, if the force of spring 27 has been regulated for a certain piece of meat to permit the expulsion of the slide when the meat is done rare, the pressure of steam developed by the evolution of moisture from the meat in arriving at that condition will be sufficient to project the slide from the heating compartment. As soon as the slide projects a sufficient distance to permit the escape of steam, only enough steam will escape to reduce the steam pressure below the force of the spring. Before that point is reached the disk 11 will have been withdrawn from the rod 19 thereby permitting the spring 20 to push the rod 19 out and break the heating circuit. As soon as sufficient steam, which is generally a small quantity, escapes to lower the steam pressure below the force of the spring 27, the spring begins to draw the slide back into the heating compartment. The first thing that will happen will be the rendering of the compartment air tight by the entry of the gaskets 14 in the opening of the compartment. Since there will be a pressure of steam against the slide, the effective force of the spring will be very small, thereby making sufficient reentry of the slide to close the heating circuit rather slow. Meanwhile the insulation around the heating compartment prevents a substantial drop of temperature therein whereby the meat is prevented from cooling. Eventually the reentry of the slide is completed and the heating current is again turned on. Once more the pressure of the steam is gradually raised until it becomes sufficient to project the slide again. This sequence of operations will go on indefinitely without any substantial change in the condition of the meat.

Consequently, constant attendance of the oven is absolutely unnecessary although for the very best results the meat should be removed on the first expulsion of the slide.

It can be readily understood from the above explanation of the method of operation of my device that the operation of the device is very economical for the reason that the heating current is turned off for a substantial proportion of the time consumed in the roasting operation. As pointed out, while the heating current is turned off the roasting is continued by the steam under pressure and the heat retained in the roasting compartment.

The switches which are to be opened and closed by the rod 19 are of a wide variety, it being possible to use switches which have a sliding contact, point contact or a contact through a medium. Switches having sliding contact and point contact, however, are not as desirable as the last mentioned type for the reason that they are inclined to sparking which is not desirable under the insurance laws. The switch shown in the drawings is of the mercury type. A bracket 28 projects rearwardly from the partition 25. It is of course to be understood that the partition 25 can be arranged much closer to the front wall of the oven and a separate partition provided to bear the bracket 28. Pivoted on the bracket 28 is an arm 29 having a sleeve 30 at its free end carrying a tube 31 which contains mercury. The rod 19 is pivoted in the arm 29 at a point between its pivot end and the sleeve 30 whereby longitudinal motion of the rod 19 oscillates the arm 29 about its pivot point. A lead-in wire 32 terminates in the upper end of the tube 31 and a wire 33 which supplies the current to the heating coil also terminates in the upper end of tube 31 at a distance from the terminal of wire 32. The spring 20 normally presses the arm 19 outwardly and keeps the tube 31 in such a position that the mercury 34 is out of contact with the terminals of wires 32 and 33. When the slide 8 is pushed in, the disk 11 pushes the rod 19 inwardly against the force of spring 20 thereby oscillating arm 29 to such a position that the mercury in tube 31 contacts the terminals of wires 32 and 33 thereby completing the circuit.

Figure 2:
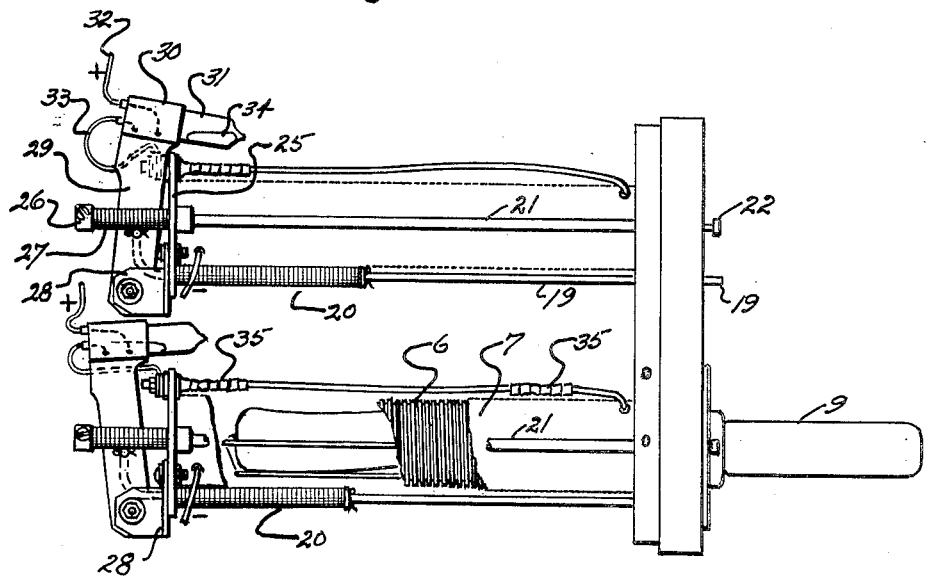
Fig. 2 is a side elevation of the interior of my device with part of one compartment cut away.

In Fig. 2 the position of the elements of the switch in open circuit position is shown applied to the upper heating compartment and the position of the elements of the switch in closed circuit position is shown applied to the lower heating compartment. The wires are preferably enamel wires covered with refractory beads 35 in order to entirely eliminate all hazard of fire or short circuit.

The rear and front walls of my oven are shown in the preferred embodiment to consist of plates of a shape to correspond with the cross section of the casing, which plates are provided with flanges 36. The free edge of each flange has its periphery reduced to fit inside the casing. On either side of each of these walls the flange has an inwardly protruding portion 37 adapted to strengthen the flange at that point and to provide a seat for a rod 38 which may be passed through the flanges of the front and rear walls of successive oven units to form a battery thereof. Likewise, several units of the type illustrated in the drawings can be mounted one upon the other in vertical alignment. It is to be understood that the shape of the casing shown in the drawings is purely illustrative and must not be taken as limitative for the reason that the casing may be circular containing only one heating unit or a great number of heating units, or it may be of polygonal cross section and contain any number of heating units.

While it is essential for economical and safe operation that upon the expulsion of the food slide from the roasting chamber by the steam pressure means should be provided for the automatic turning off of the heating current, it is apparent that the device illustrated and described could be so constructed that the heating current would not be turned off automatically upon the expulsion of the food slide from the roasting chamber. Naturally, the resulting device would be lacking in many of the advantageous features of the device illustrated. I merely call attention to the fact, however, to emphasize the novelty of the construction of the heating chamber and food slide of my device even in the absence of the means for causing them to cooperate with the control of the heating current.

Having thus described the nature and objects of my invention and illustrated a preferred embodiment of the same, what I claim as new and useful and desire to secure by Letters Patent is:

1. In an oven, in combination, a roasting compartment, a food tray adapted to slide in and out of said compartment, means for rendering said compartment air tight when the tray is in said compartment, whereby the vapors evolved from the food during the roasting process will build up a pressure which will in time become sufficient to move out the food tray from the roasting compartment, and means for retarding the outward movement of said food tray calibrated to resist the vapor pressure in the oven until it reaches a value representing the completion of the roasting.

2. In an oven, in combination, a roasting compartment, a food tray adapted to slide in and out of said compartment, means on said food tray for rendering said compartment air tight when the tray is in said compartment, whereby the vapors evolved from the food during the roasting process will build up a pressure which will in time become sufficient to move out the food tray from the roasting compartment, and means for retarding the outward movement of said food tray, and means tending to force said food tray into the compartment against the action of the evolved vapors.

3. In an electric oven, in combination, a horizontally arranged roasting compartment having an open end, a food tray slidably arranged in said compartment, means carried by said food tray for rendering said compartment air tight when the tray is in the compartment, whereby the vapors evolved from the food during the roasting process will build up a pressure which will in time become sufficient to move out the food tray from the roasting compartment, and means for retarding the outward movement of said food tray from the compartment calibrated to resist the vapor pressure in the oven until it reaches a value representing the completion of the roasting.

4. In an electric oven, in combination, a horizontally arranged roasting compartment having an open end, a food tray slidably arranged in said compartment, means carried by said food tray for rendering said compartment air tight when the tray is in the compartment, whereby the vapors evolved from the food during the roasting process will build up a pressure which will in time become sufficient to move out the food tray from the roasting compartment, and means for retarding the outward movement of said food tray from the compartment, said means comprising a spring tending to force said food tray into the compartment against the action of the evolved vapors.

5. In an electric oven, in combination, a roasting compartment, a food tray adapted to slide in and out of said compartment, means carried by said food tray for closing the heating circuit when the tray is completely inserted in the roasting compartment, means on said food tray for rendering said compartment air tight when the tray is in said compartment, whereby the vapors evolved from the food during the roasting process will build up a pressure which will in time become sufficient to move out the food from the roasting compartment and means for breaking the heating circuit when the food tray is moved out from the roasting compartment a distance permitting the escape of vapors from said compartment.

6. In an electric oven, in combination, a horizontally arranged roasting compartment having an open end, a food tray slidably arranged in said compartment, means carried by said food tray for closing the heating circuit when the tray is completely inserted in the roasting compartment, means carried by said food tray for rendering said compartment air tight when the tray is in the compartment, whereby the vapors evolved from the food during the roasting process will build up a pressure which will in time become sufficient to move out the food tray from the roasting compartment, and means for breaking the heating circuit when the food tray is moved out from the roasting compartment a distance permitting the escape of vapors from said compartment.

7. In an electric oven, in combination, a roasting compartment, a food tray adapted to slide in and out of said compartment, means carried by said food tray for closing the heating circuit when the tray is completely inserted in the roasting compartment, means on said food tray for rendering said compartment air tight when the tray is in said compartment, whereby the vapors evolved from the food during the roasting process will build up a pressure which will in time become sufficient to move out the food from the roasting compartment, and means operated by the moving out of the food tray from the roasting compartment a distance permitting the escape of vapors from said compartment for breaking the heating circuit.

8. In an electric oven, in combination, a horizontally arranged roasting compartment having an open end, a food tray slidably arranged in said compartment, means carried by said food tray for closing the heating circuit when the tray is completely inserted in the roasting compartment, means carried by said food tray for rendering said compartment air tight when the tray is in the compartment, whereby the vapors evolved from the food during the roasting process will build up a pressure which will in time become sufficient to move out the food tray from the roasting compartment, and means operated by the moving out of the food tray from the roasting compartment a distance permitting the escape of vapors from said compartment for breaking the heating circuit.

9. In an electric oven, in combination, a roasting compartment, a heating circuit for said compartment, a food tray adapted to slide in and out of said compartment, means on said food tray for rendering said compartment air tight when the tray is in said compartment, whereby the vapors evolved from the food during the roasting process will build up a pressure which will in time become sufficient to move out the food tray from the roasting compartment, and means operated by the moving out of the food tray from the roasting compartment a distance permitting the escape of vapors from said compartment for breaking the heating circuit.

10. In an electric oven, in combination, a roasting compartment, a heating circuit for said compartment, a food tray adapted to slide in and out of said compartment, means on said food tray for rendering said compartment air tight when the tray is in said compartment, whereby the vapors evolved from the food during the roasting process will build up a pressure which will in time become sufficient to move out the food tray from the roasting compartment, means for retarding the outward movement of said food tray, and means operated by the moving out of the food tray from the roasting compartment a distance permitting the escape of vapors from said compartment for breaking the heating circuit.

11. In an electric oven, in combination, a roasting compartment, a heating circuit for said compartment, a food tray adapted to slide in and out of said compartment, means carried by said food tray for closing the heating circuit when the food tray is completely inserted in the roasting compartment, means for rendering said compartment air tight when the tray is in said compartment, whereby the vapors evolved from the food during the roasting process will build up a pressure which will in time become sufficient to move out the food tray from the roasting compartment, and means for retarding the outward movement of said food tray calibrated to resist the vapor pressure in the oven until it reaches a value representing the completion of the roasting.

12. In an electric oven, in combination, a roasting compartment, a heating circuit for said compartment, a food tray adapted to slide in and out of said compartment, means carried by said food tray for closing the heating circuit when the food tray is completely inserted in the roasting compartment, means for rendering said compartment air tight when the tray is in said compartment, whereby the vapors evolved from the food during the roasting process will build up a pressure which will in time become sufficient to eject the food tray from the roasting compartment, means for retarding the ejection of said food tray, and means operated by the outward movement of the food tray from the roasting compartment a distance permitting the escape of vapors from said compartment for breaking the heating circuit.

13. In an electric oven, in combination, a roasting compartment, a food tray adapted to slide in and out of said compartment, a rotatable handle attached to said tray, and means situated between said tray and said handle comprising a resilient disc adapted to constitute an air-tight stopper for said compartment and adapted to have the size of its periphery changed by compression applied by rotation of said handle.

14. In an electric oven, in combination, a horizontally arranged roasting compartment having an open end, a food tray slidably arranged in said compartment, a disk carried by said food tray of sufficient size to cover the open end of said compartment, a rotatable handle extending beyond said disk, resilient material arranged between said tray and said disk and adapted to embrace the wall of the roasting compartment and means operated by the rotation of said handle for varying the size of the periphery of said resilient material.

15. In an oven, in combination, a roasting compartment, a food tray adapted to slide in and out of said compartment, means on said food tray for rendering said compartment air tight when the tray is in said compartment, whereby the vapors evolved from the food during the roasting process will build up a pressure which will in time become sufficient to move out the food tray from the roasting compartment, and means for retarding the outward movement of said tray, said means comprising a spring tending to force said food tray into the compartment against the action of the evolved vapors.

16. In an electric oven, in combination, a roasting compartment, a heating circuit for said compartment, a oscillatable make and break switch for said circuit pivotally mounted and capable of occupying an open circuit position and a closed circuit position, a rod pivotally connected to said switch in such a manner that longitudinal movement of said rod causes oscillation of said switch from one position to another, a spring encircling said rod and normally forcing the free end thereof to a position beyond the open end of said roasting compartment and adjacent thereto, in which position said rod holds said switch in open circuit position, a food tray adapted to slide in and out of said compartment, a disc carried by said food tray for abutting the free end of said rod and moving said rod longitudinally when said tray is moved into roasting position whereby said switch is moved by said rod into closed circuit position, means for rendering said compartment air-tight when the tray is in said compartment, whereby the vapors evolved from the food during the roasting process will build up a pressure which will in time become sufficient to move out the food tray from the roasting compartment, whereupon the said disc releases the free end of said rod and permits said rod to move upwardly by spring action, thereby moving said switch to open circuit position, and means for retarding the outward movement of said tray.

In testimony whereof I have hereunto set my hand.

JOSEPH ARTHUR DUMAS.